(12) United States Patent
Oliphant et al.

(10) Patent No.: US 8,016,268 B2
(45) Date of Patent: Sep. 13, 2011

(54) WIND TOWER SERVICE LIFT

(75) Inventors: David Oliphant, West Jordan, UT (US);
Jared Quilter, Heber City, UT (US);
Todd Andersen, Heber City, UT (US);
Thomas Conroy, Midway, UT (US)

(73) Assignee: Wind Tower Systems, LLC, Heber City, UT (US)

( * ) Notice: Subject to any disclaimer, the term of this patent is extended or adjusted under 35 U.S.C. 154(b) by 700 days.

(21) Appl. No.: 12/130,922

(22) Filed: May 30, 2008

(65) Prior Publication Data

US 2009/0294219 A1    Dec. 3, 2009

(51) Int. Cl.
*B66D 1/26*    (2006.01)
(52) U.S. Cl. ........................................... 254/278
(58) Field of Classification Search ............ 254/278
See application file for complete search history.

(56) References Cited

U.S. PATENT DOCUMENTS

| | | |
|---|---|---|
| 877,587 A | 1/1908 | Noyes |
| 889,395 A | 6/1908 | Noyes |
| RE12,842 E | 8/1908 | Noyes |
| 1,506,984 A | 9/1924 | Marshall |
| 2,014,784 A | 9/1935 | Schuler |
| 2,135,631 A | 11/1938 | Amesbury |
| 2,145,232 A | 1/1939 | Bauer |
| 2,246,151 A | 6/1941 | Vrooman |
| 2,756,952 A | 7/1956 | Gazley |
| 2,945,231 A | 7/1960 | Scheldorf |
| 2,950,576 A | 8/1960 | Rubenstein |
| 3,079,277 A | 2/1963 | Painter |
| 3,100,555 A | 8/1963 | Ashton |
| 3,119,471 A | 1/1964 | Turner |
| 3,219,214 A | 11/1965 | Baer |
| 3,276,762 A | 10/1966 | Thomas |
| 3,277,614 A | 10/1966 | Marie |
| 3,371,458 A | 3/1968 | Sturgill |
| 3,456,972 A | 7/1969 | Drotar |

(Continued)

FOREIGN PATENT DOCUMENTS

DE    194961    2/1908

(Continued)

OTHER PUBLICATIONS

Argyriadis et al., Determination of Fatigue Loading on a Wind Turbine with Oil Damping Device, Germanischer Lloyd WindEnergie GmbH, 2004, Hamburg, Germany.

*Primary Examiner* — Emmanu M Marcelo
(74) *Attorney, Agent, or Firm* — Dority & Manning, P.A.

(57) ABSTRACT

An apparatus used for maintaining a wind tower structure wherein the wind tower structure may have a plurality of legs and may be configured to support a wind turbine above the ground in a better position to interface with winds. The lift structure may be configured for carrying objects and have a guide system and drive system for mechanically communicating with a primary cable, rail or other first elongate member attached to the wind tower structure. The drive system and guide system may transmit forces that move the lift relative to the cable and thereby relative to the wind tower structure. A control interface may be included for controlling the amount and direction of the power into the guide system and drive system thereby causing the guide system and drive system to move the lift relative to said first elongate member such that said lift moves relative to said wind tower structure.

37 Claims, 14 Drawing Sheets

U.S. PATENT DOCUMENTS

| | | | |
|---|---|---|---|
| 3,485,005 A | 12/1969 | Kutchai | |
| 3,561,711 A | 2/1971 | Dodge | |
| 3,574,982 A | 4/1971 | Wakonig | |
| 3,618,928 A | 11/1971 | Taylor | |
| 3,634,989 A | 1/1972 | Rogers | |
| 3,650,078 A | 3/1972 | Jennings | |
| 3,650,081 A | 3/1972 | McCracken | |
| 3,659,490 A | 5/1972 | Buck | |
| 3,710,674 A | 1/1973 | Tabor | |
| 3,742,662 A | 7/1973 | Ballou | |
| 3,747,695 A | 7/1973 | Branham | |
| 3,763,617 A | 10/1973 | Nell | |
| 3,812,771 A | 5/1974 | Yokoyama et al. | |
| 3,892,398 A | 7/1975 | Marsh | |
| 3,939,988 A | 2/1976 | Wellman | |
| 4,039,050 A | 8/1977 | Bowling et al. | |
| 4,226,554 A | 10/1980 | Vandiver et al. | |
| 4,254,847 A | 3/1981 | Kamman et al. | |
| 4,261,441 A | 4/1981 | Wood | |
| 4,272,929 A | 6/1981 | Hanson | |
| 4,278,726 A | 7/1981 | Wieme | |
| 4,287,967 A * | 9/1981 | Perkins | 187/268 |
| 4,297,076 A | 10/1981 | Donham et al. | |
| 4,311,434 A | 1/1982 | Abe | |
| 4,312,162 A | 1/1982 | Medney | |
| 4,320,602 A | 3/1982 | Richardson | |
| 4,403,916 A | 9/1983 | Skelskey | |
| 4,406,558 A | 9/1983 | Kochendorfer et al. | |
| 4,411,114 A | 10/1983 | Wurtinger et al. | |
| 4,420,692 A | 12/1983 | Kos et al. | |
| 4,435,647 A | 3/1984 | Harner et al. | |
| 4,457,500 A | 7/1984 | Drachenberg et al. | |
| 4,515,525 A | 5/1985 | Doman | |
| 4,565,929 A * | 1/1986 | Baskin et al. | 290/44 |
| 4,674,954 A | 6/1987 | Kenfield | |
| 4,694,630 A | 9/1987 | McGinnis | |
| 4,743,141 A | 5/1988 | Simensen et al. | |
| 4,783,937 A | 11/1988 | Sato | |
| 4,807,840 A | 2/1989 | Baker et al. | |
| 4,856,662 A | 8/1989 | Marvin et al. | |
| 4,921,224 A | 5/1990 | Fukumura et al. | |
| 4,987,711 A | 1/1991 | Noji et al. | |
| 5,070,663 A | 12/1991 | Sakai et al. | |
| 5,203,435 A | 4/1993 | Dolgin | |
| 5,213,470 A | 5/1993 | Lundquist | |
| 5,219,051 A | 6/1993 | Davis | |
| 5,239,789 A | 8/1993 | Uno et al. | |
| 5,327,700 A | 7/1994 | Sorenson et al. | |
| 5,347,771 A | 9/1994 | Kobori et al. | |
| 5,775,049 A | 7/1998 | Fricke | |
| 5,820,348 A | 10/1998 | Fricke | |
| 5,832,688 A | 11/1998 | Crissey et al. | |
| 5,905,771 A | 5/1999 | Erbes et al. | |
| 5,946,866 A | 9/1999 | Weglewski et al. | |
| 5,956,915 A | 9/1999 | Piper et al. | |
| 6,048,426 A | 4/2000 | Pratt | |
| 6,287,664 B1 | 9/2001 | Pratt | |
| 6,354,576 B1 | 3/2002 | Jacobs et al. | |
| 6,397,528 B1 | 6/2002 | Rahimian | |
| 6,408,587 B2 | 6/2002 | Cronin et al. | |
| 6,438,905 B2 | 8/2002 | Constantinou | |
| 6,453,962 B1 | 9/2002 | Pratt | |
| 6,463,709 B2 | 10/2002 | Meguro et al. | |
| 6,467,521 B1 | 10/2002 | Pratt | |
| 6,522,025 B2 | 2/2003 | Willis et al. | |
| 6,578,339 B1 | 6/2003 | McGinnis | |
| 6,614,125 B2 | 9/2003 | Willis et al. | |
| 6,626,642 B1 | 9/2003 | Veldkamp | |
| 6,672,837 B1 | 1/2004 | Veldkamp et al. | |
| 6,695,588 B1 | 2/2004 | Nielsen | |
| 6,701,680 B2 | 3/2004 | Fanucci et al. | |
| 6,745,539 B1 | 6/2004 | Heim | |
| 6,782,667 B2 | 8/2004 | Henderson | |
| 6,784,566 B2 | 8/2004 | Thomas | |
| 6,789,309 B2 | 9/2004 | Kondo | |
| 6,837,010 B2 | 1/2005 | Powell et al. | |
| 6,840,016 B1 | 1/2005 | Mualla | |
| 7,015,872 B1 | 3/2006 | Little | |
| 7,040,583 B1 | 5/2006 | Holland et al. | |
| 7,062,883 B1 | 6/2006 | Langholz et al. | |
| 7,075,189 B2 | 7/2006 | Heronemus et al. | |
| 7,220,104 B2 | 5/2007 | Zheng et al. | |
| 2002/0084142 A1 | 7/2002 | Brennan et al. | |
| 2003/0071468 A1 | 4/2003 | Platt | |
| 2003/0183594 A1 | 10/2003 | Torres Martinez | |
| 2005/0186076 A1 | 8/2005 | Hessel | |
| 2006/0090571 A1 | 5/2006 | Krampitz et al. | |
| 2006/0120809 A1 | 6/2006 | Ingram et al. | |
| 2006/0147306 A1 | 7/2006 | Zheng et al. | |
| 2006/0213145 A1 | 9/2006 | Haller | |
| 2007/0243063 A1 | 10/2007 | Schellstede | |

FOREIGN PATENT DOCUMENTS

| | | |
|---|---|---|
| DE | 94 14 643.8 | 1/1995 |
| DE | 196 47 515 | 11/1996 |
| DE | 197 41 988 | 9/1997 |
| EP | 1 284 365 | 2/2003 |
| EP | 1 677 006 | 7/2006 |
| FR | 2 500 555 | 8/1982 |
| GB | 1008782 | 11/1965 |
| JP | 3-539 134078 | 1/1991 |
| JP | 10-205430 | 8/1998 |
| SU | 1421959 | 9/1988 |
| WO | 96/10130 | 4/1996 |
| WO | 97/21621 | 6/1997 |
| WO | 00/77394 | 12/2000 |
| WO | 2006/062390 | 6/2006 |

\* cited by examiner

WIND TOWER SERVICE LIFT

STATEMENT REGARDING STATE OF CALIFORNIA SPONSORED RESEARCH OR DEVELOPMENT

This invention was made with State of California support under California Energy Commission grant number PIR-04-012. The Energy Commission has certain rights in this invention.

CROSS-REFERENCE TO RELATED APPLICATIONS

Not Applicable.

BACKGROUND

The present disclosure is directed to a maintenance system, apparatus and method for maintaining a wind tower or plurality of wind towers. In particular, the disclosure is directed to an apparatus for elevating a user within a wind tower and it's use therein including using the apparatus in a plurality of wind towers.

Wind towers are subject to various wearing forces such as vibration, flexure, heat expansion and contraction, and material oxidation. Due to these wearing factors the wind towers often need maintenance. Because the size of the towers reaching the areas in need of maintenance can pose a challenge requiring the need for an apparatus for reaching the worn components. Such apparatuses can be expensive and may spend much of their service life idle. Duplicating these apparatuses for maintaining a plurality of wind towers creates a multiplied expense adding to the cost of wind energy production. What is needed is an apparatus for maintaining a wind tower or a plurality of wind towers that can reduce the cost of capturing wind energy.

SUMMARY OF THE DISCLOSURE

This disclosure will set forth embodiments of an apparatus used for maintaining a wind tower structure wherein the wind tower structure may have a plurality of legs and may be configured to support a wind turbine above the ground in a better position to interface with winds. The lift structure may be configured for carrying objects such as workers and/or cargo, and have a guide system and/or drive system for mechanically communicating with a primary cable, rail or other first elongate member attached to the wind tower structure. The drive system and/or guide system may transmit forces that move the lift relative to the cable and thereby relative to the wind tower structure. A control interface may be included for controlling the amount and direction of the power into the guide system and drive system thereby causing the guide system and drive system to move the lift relative to said first elongate member such that said lift moves relative to said wind tower structure.

Disclosed herein will be embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and may have a drive system and/or a guide system for mechanically communicating with a primary cable, rail or a first elongate member attached to the wind tower structure. The drive system and guide system may transmit forces that move the lift relative to the cable and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The lift may have a motor in communication with said drive system and/or guide system and may be adapted to provide a force into the drive system and/or guide system that is transferred thereby to said elongate member and controlled by said control interface.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and/or guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The drive system and/or guide system may be detachable and attachable to said elongate member.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and/or guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The drive system and/or guide system may comprise a drive system to interface with a second elongate member and move the lift relative to the second elongate member.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and/or guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The drive system and/or guide system may have a rotatable element that rotates relative to the lift placed generally at the axis of yaw thereby allowing the service lift to be controllable respect to yaw.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and/or guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. Additionally a height adjustment structure configured to allow the service lift to be shortened for portability may be included.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a guide system and drive system for mechanically communicating with a primary cable, rail or a first elongate member attached to the wind tower structure. The guide system and drive system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The lift may have an attachment structure configured to mechanically attach to a member extending from the wind tower structure for aiding in further controlling the yaw of the lift relative to the tower structure.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and/or guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The embodiment may have an attachment structure configured to mechanically attach to a second elongate member extending from the wind tower structure for controlling the radial positioning of the lift relative to the wind tower structure.

This disclosure will set forth embodiments of an apparatus used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and guide system for mechanically communicating with a primary cable, rail or a first elongate member attached to the wind tower structure. The drive system and/or guide system may transmit forces that work to move the lift relative to the cable, rail or first elongate member and thereby relative to the wind tower structure. A control interface may be included for controlling the amount and direction of the power into the drive system and guide system thereby causing said guide system and drive system to move the lift relative to said first elongate member such that said lift moves relative to said wind tower structure. The embodiment may have an attachment structure configured to mechanically attach to a second elongate member extending from the wind tower structure for controlling the radial positioning of the lift relative to the wind tower structure. This structure may be incorporated into the drive system and/or guide system such that the drive system and/or guide system mechanically communicates with the first and second elongate members contemporaneously to move the lift in a vectored path.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and/or guide system for mechanically communicating with a primary cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and guide system for mechanically communicating with a primary cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and/or guide system thereby causing said drive system and/or guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. A second elongate member for controlling the yaw of the lift relative to the tower structure may be included in the system.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and guide system for mechanically communicating with a primary cable, rail or a first elongate member attached to the wind tower structure. The guide system may transmit forces that move the lift relative to the cable, rail or first elongate member and thereby relative to the wind tower structure. A control interface may be included for controlling the amount and direction of the power into the drive system and guide system thereby causing said drive system and guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. A second elongate member for controlling the yaw of the lift relative to the tower structure may be included in the system and may have a lateral component allowing a user to draw closer to a portion of the tower.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and a guide system for mechanically communicating with a primary cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and guide system thereby causing said drive system and guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. A second elongate member for controlling the radial placement of the lift relative to the tower structure may be provided.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and a guide system for mechanically communicating with a primary cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and guide system thereby causing said drive system and/or guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. The system may have a transport for transporting the lift inside and outside of the tower structure.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and a guide system for mechanically communicating with a primary cable, rail or a first elongate member attached to the wind tower structure. The drive system and a guide system may transmit forces that move the lift relative to the cable, rail or first elongate member and thereby relative to the wind tower structure. A control interface may be included for controlling the amount and direction of the power into the drive system and a guide system thereby causing said drive system and a guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. The system may have a transport for transporting the lift inside and outside of the tower structure and is configured such that a portion of the transport can enter into the opening in the tower structure.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and a guide system for mechanically communicating with a primary cable, rail or a first elongate member attached to the wind tower structure. The drive system and a guide system may transmit forces that move the lift relative to the cable, rail or first elongate member and thereby relative to the wind tower structure. A control interface may be included for controlling the amount and direction of the power into the drive system and a guide system thereby causing said drive system and a guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. The system may have a transport for transporting the lift inside and outside of the tower structure and is configured such that at least a portion of the transport can enter into the opening in the tower structure.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and a guide system for mechanically communicating with a primary cable, rail or a first elongate member attached to the wind tower structure. The drive system and a guide system may transmit forces that move the lift relative to the cable, rail or first elongate member and thereby relative to the wind tower structure. A control interface may be included for controlling the amount and direction of the power into the drive system and the guide system thereby causing said drive system and guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. The system may have a transport for transporting the lift inside and outside of the tower structure and is configured such the entire transport may fit with in the tower structure.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and guide system for mechanically communicating with a primary cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and guide system thereby causing said drive system and guide system to move the lift relative to said first elongate member such that said lift moves relative to said wind tower structure. The embodiment may have a motor for providing a lifting force for the system. The embodiment may include an opening in the tower structure configured to allow placement of the lift within the interior of the tower structure. The lift may be mobile and able to self motivate in and out of the opening in the structural tower.

This disclosure will set forth embodiments of a system used for maintaining a wind tower structure wherein the wind tower structure may have a plurality of legs defining a space there between and may be configured to support a wind turbine above the ground in a better position to interface with wind. The lift structure may be configured for carrying objects such as workers and/or cargo and have a drive system and guide system for mechanically communicating with a cable, rail or a first elongate member attached to the wind tower structure. The drive system and guide system may transmit forces that move the lift relative to the cable, rail or first elongate member and thereby relative to the wind tower structure. A control interface may be included for controlling the amount and direction of the power into the drive system and guide system thereby causing said drive system and guide system to move the lift relative to said first elongate member such that said lift moves relative to said wind tower structure. The embodiment may have a motor for providing a lifting force for the system wherein said motor resides on said wind tower structure. The embodiment may include an opening in the tower structure configured to allow placement of the lift within the interior of the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The method may include connecting the lift to the tower using an elongate member disposed between the tower structure and the lift. The method may include positioning the lift configured for carrying objects such as workers and/or cargo into a position on said elongate member to perform maintenance by actuating a control for controlling a motor that provides a force.

This disclosure will set forth embodiments of a method for maintaining a tower that is supporting a wind turbine. The method may include positioning a lift within a tower structure through an opening in the tower structure that has been designed to allow placement of the lift within the tower structure. The method may include connecting the lift to the tower using an elongate member disposed between the tower structure and the lift. The method may include positioning the lift configured for carrying objects such as workers and/or cargo into a position on said elongate member to perform maintenance by actuating a control for controlling a motor that provides a force. The method may include positioning the lift by exerting a force in a direction normal to the elongate member for positioning the lift radially relative to the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. The method may include positioning by exerting a force in a lateral direction for positioning the lift radially relative to the tower structure and may laterally position the lift closer to a structure in need of maintenance in the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. Additionally, the method may include transporting a lift inside and outside of the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. Additionally, the method may include transporting a lift such that only a portion of the transport is placed into the opening in the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. Additionally, the method may include transporting a lift such that the entire transport is placed into the tower structure.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. Additionally, the method may include transporting a lift inside and outside the tower structure and transporting the lift to a plurality of tower structures.

This disclosure will set forth embodiments of a method for maintaining a tower that is supporting a wind turbine. The method may include positioning a lift within a tower structure through an opening in the tower structure that has been designed to allow placement of the lift within the tower structure. The lift may be connected to the tower using an elongate member disposed between the tower structure and the lift. The method may include positioning the lift configured for carrying objects such as workers and/or cargo into a position on said elongate member to perform maintenance by actuating a control for controlling a motor that provides a force. Additionally, the method may include storing the lift within a tower structure.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
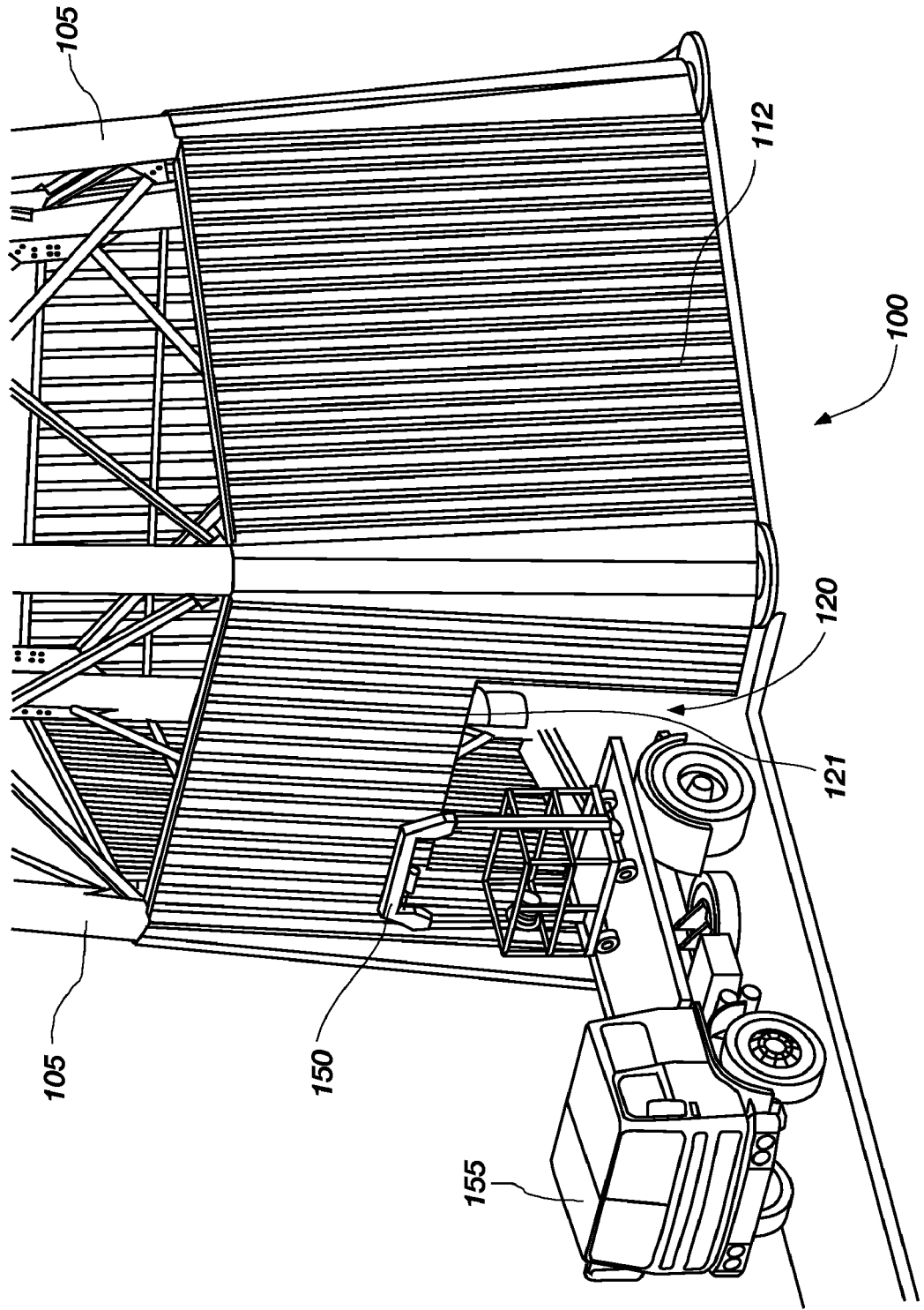
FIG. 1, illustrates an embodiment of a system useful in maintaining a wind tower structure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method processes.

Referring now to FIG. 1, an embodiment of a system useful in maintaining a wind tower structure will be described. A wind tower structure 100 may have a plurality of legs 105 and may be configured to support a wind turbine in a position to interface with wind. The wind tower structure 100 may be constructed using a single leg having space therein large enough for a service lift to fit therein. The wind tower structure 100 may covered in a cladding 112 that may offer protection from the elements and may contribute to structural properties of the wind tower structure 100.

An opening 120 may be provided with in the cladding 112 of the wind tower structure. A door may be provided for the opening 120 allowing a tower keeper to open and close the opening 120 as desired for maintenance of the wind tower structure 100. The door may be used to access items that may have been stored within the wind tower structure 100. The door may be configured to open inward or outward. The door may be of a lifting type that may be seen on a garage automatic or otherwise. The opening 120 may be configured to accept a lift 150 there through either alone or on a transport 155. The opening 120 may be configured to accept a lift 150 in a compacted state there through either alone or on a transport 155. The opening 120 may have a door 121 for opening and closing the opening 120. The door 121 may be of various configurations in addition to the roll up style shown in the illustration.

The system may include a lift 150 that may be configured for carrying cargo and/or a person that may be performing maintenance and related activities. The lift 150 may be configured to be used with a transport 155.

The transport 155 as illustrated is a flatbed truck, however many different vehicles and or specialized equipment may be used to transport the lift 150. For example, a common fork lift may be used as a transport. Additionally, a trailer that is connected to a powered vehicle may be used. The lift 150 may have a mechanism that allows it to be self motivated to move in and out of the tower. The transport may be adjustable for receiving various configurations of lifts.

The transport 155 may be configured for taking a lift from one wind tower structure to another. The transport 155 may be configured to insert a portion of a caring surface into a tower. The transport 155 may be configured to move entirely into a wind tower structure.

Figure 2:
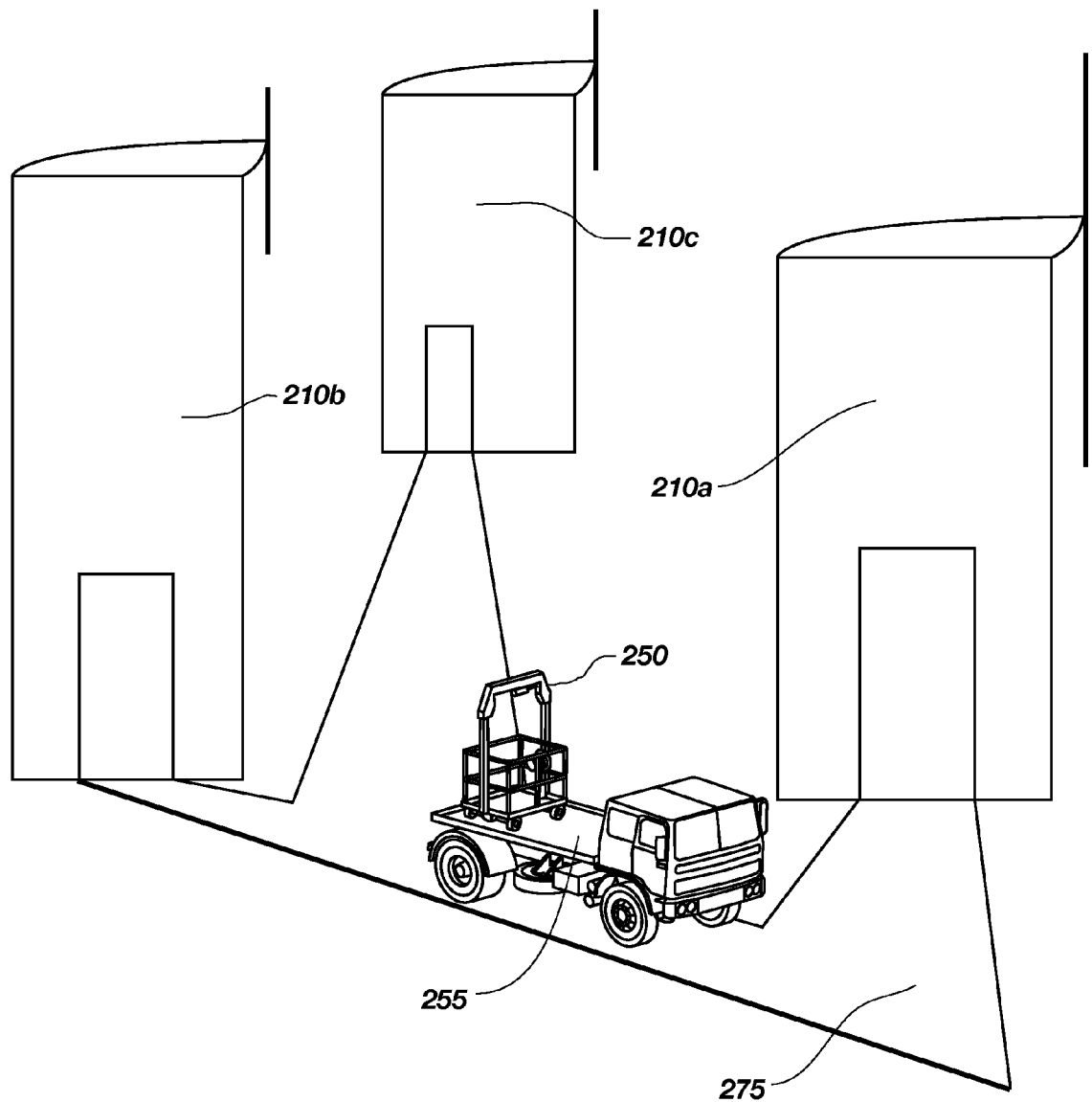
FIG. 2 illustrates an embodiment of a use of a transport as part of a system useful in maintaining a wind tower structure comprising a plurality of wind tower structures.

FIG. 2 illustrates a use of a transport 255 as part of a system comprising a plurality of wind tower structures 210a, 210b, 210c. A transport 255 may transport a lift 250 that may be configured for carrying cargo and/or a person that may be performing maintenance and related activities. The lift 250 may be configured to be used with a transport 255 of specific configuration. The transport 255 as illustrated is a flatbed truck, however many different vehicles and or specialized equipment may be used to transport the lift 250. For example, a common fork lift may be used as a transport. Additionally, a trailer that is connected to a powered vehicle may be used. The transport 255 may be adjustable for receiving various configurations of lifts 250. The transport 255 may be configured for taking a lift 250 from one wind tower structure to another on a path 275 or may be configured for traversing the type of terrain surrounding the wind towers 210a, 210b, 210c. The transport 255 may be configured to insert a portion of a carrying surface into a tower. The transport 255 may be configured to move entirely into a wind tower structure.

Figure 3:
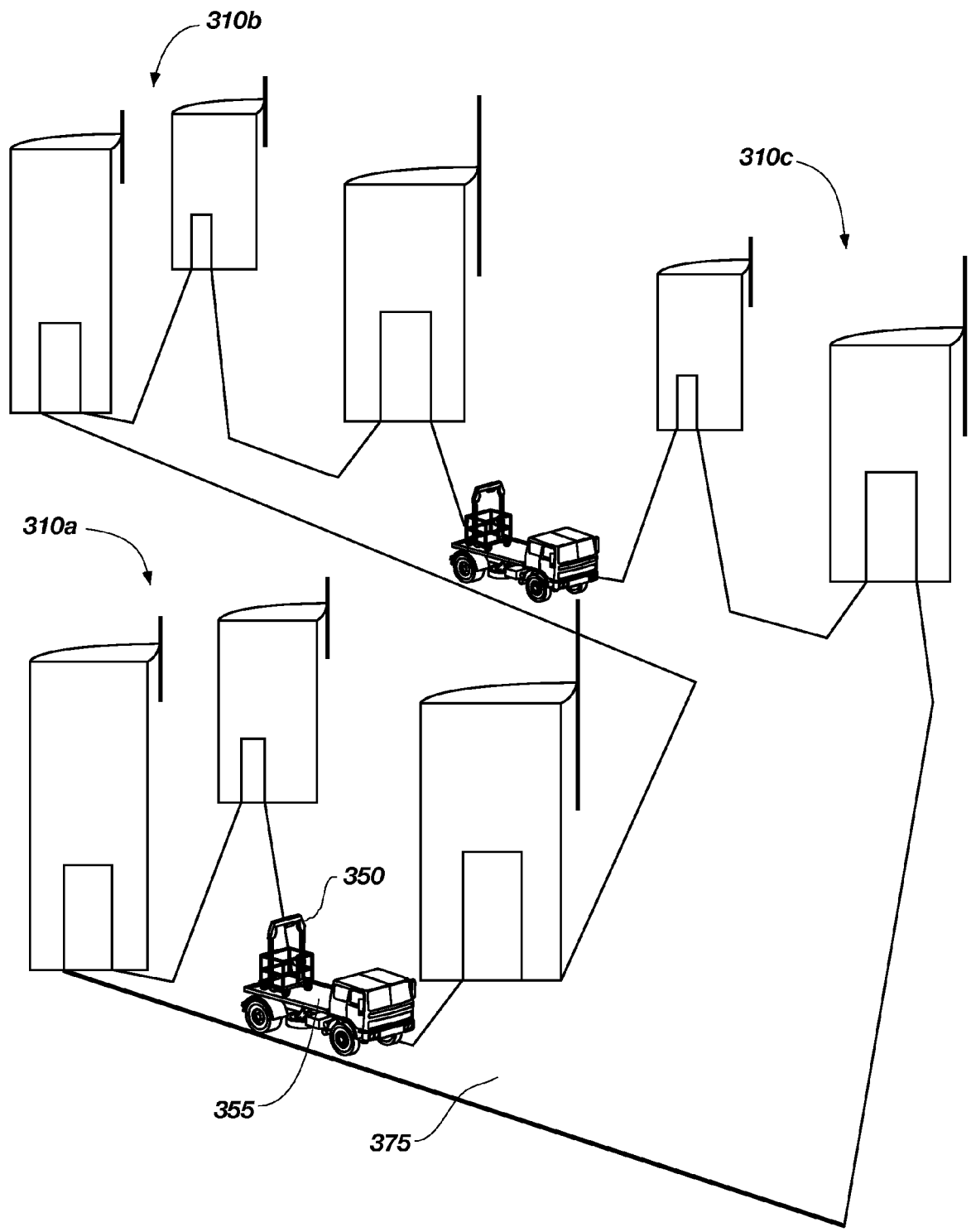
FIG. 3 illustrates an embodiment of a system useful in maintaining a wind tower structure including a plurality of transports.

FIG. 3 illustrates a system including a plurality of transports. The terrain may require that a system include a plurality of transports configured to meet the terrain surrounding a subgroup of towers. Another sub-group may have a different type of terrain thereabout and require a transport of differing configuration. A transport 355 may transport a lift 350 that may be configured for carrying cargo and/or a person that may be performing maintenance and related activities. The lift 350 may be configured to be used with a transport 355 of specific configuration. The transport 355 as illustrated is a flatbed truck, however many different vehicles and or specialized equipment may be used to transport the lift 350. For example, a common fork lift may be used as a transport. Additionally, a trailer that is connected to a powered vehicle may be used. The transport 355 may be adjustable for receiving various configurations of lifts 350. The transport 355 may be configured for taking a lift 350 from one wind tower structure to another on a path 375 or may be configured for traversing the type of terrain surrounding the wind tower groups 310a, 310b, 310c. The transport 355 may be configured to insert a portion of a carrying surface into a tower. The transport 355 may be configured to move entirely into a wind tower structure. A plurality of transports provides the advantage of having a back up transport on site.

Figure 4:
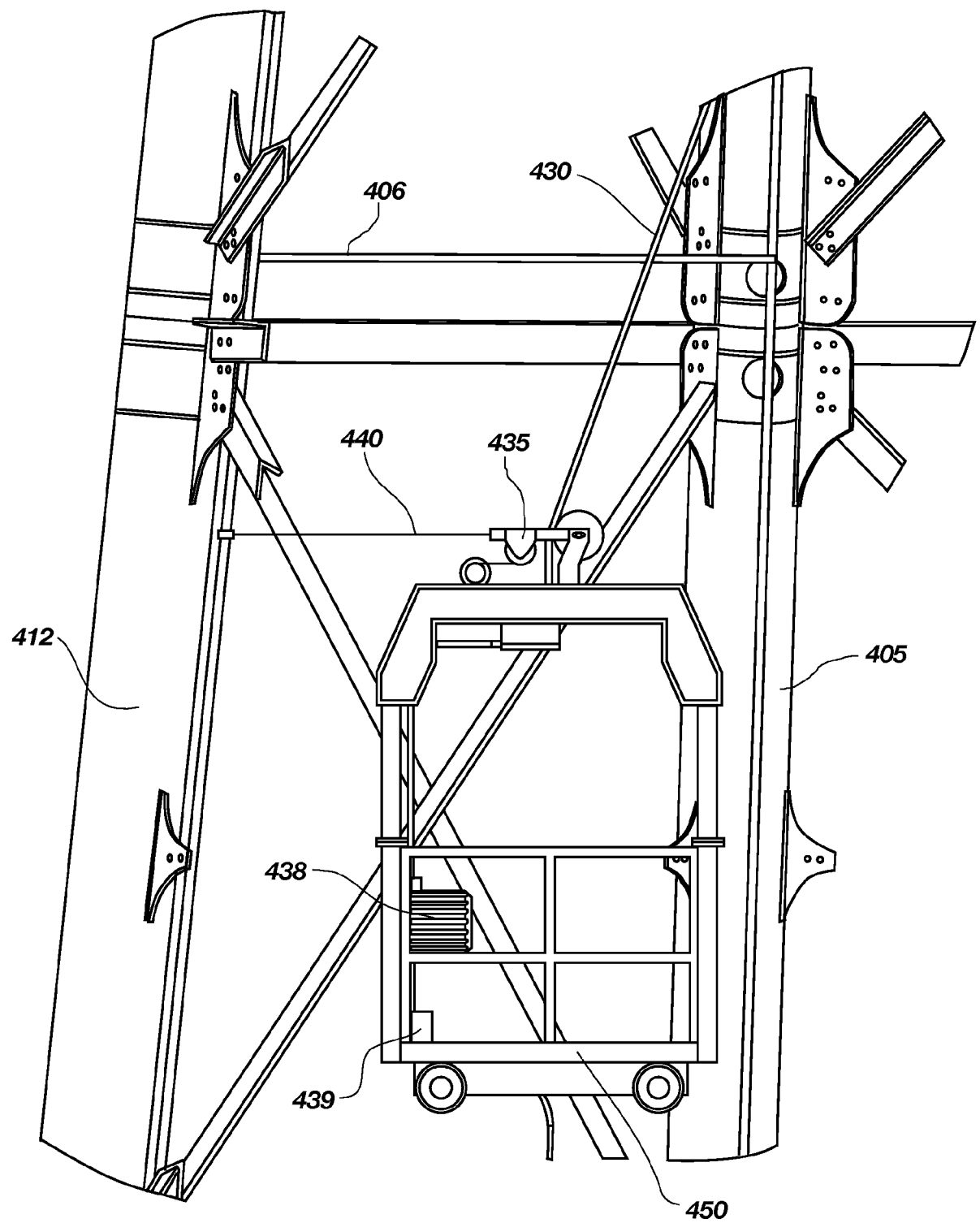
FIG. 4 illustrates an embodiment of a lift in use within a wind tower structure in a system useful in maintaining a wind tower structure.

FIG. 4 illustrates the lift in use within a wind tower structure. A wind tower structure 400 may have a plurality of legs 405 and may be configured to support a wind turbine in a position to interface with wind. The wind tower structure 400 may be constructed using a single leg having space therein large enough for a service lift to fit therein. The wind tower structure 400 may be covered in a cladding 412 that may offer protection from the elements and may contribute to structural properties of the wind tower structure 400. An elongate member 430 may be provided as a lifting structure within the wind tower structure 400 and may be attached to the wind tower structure 400 near the top portion providing a generally vertical potential in movement. The elongate member 430 may be a cable, rail or chain so long as it provides the structure necessary to support the lift during movement and maintenance work. A lift 450 may be of standard off the shelf type or one dedicated for a specific use. A lift 450 may comprise a guide system for mechanically communicating with the elongate member 430 of a wind tower structure 400 wherein said guide system 430 is configured to move along the elongate member. The lift 450 may include a control interface 439 for controlling the guide system 435 and a drive system 438 in communication with the guide system 435 and adapted to provide a force into or through the guide system 435. The guide system 435 may be detachable from and attachable to said elongate member 435 such that the lift may be moved to another tower. The guide system 435 may be detachable from and attachable to said service lift 450, and may be detached for compactness or for servicing. The lift 450 may include a lateral connection structure 440 for attaching to other tower structures and used control yaw and radial placement of the lift. The other tower structures may be a leg 405 or lateral cable or bar 406. Any tower structure that is capable of bearing the load of positioning the lift 450 is relevant to the disclosure and considered within its scope. The lateral connection structure 440 may have a component such as a cable or chain that is able to worked upon by a guide system 435 or a second component within a guide system 435 to move the lift laterally by controlling the guide system 435.

Figure 5:
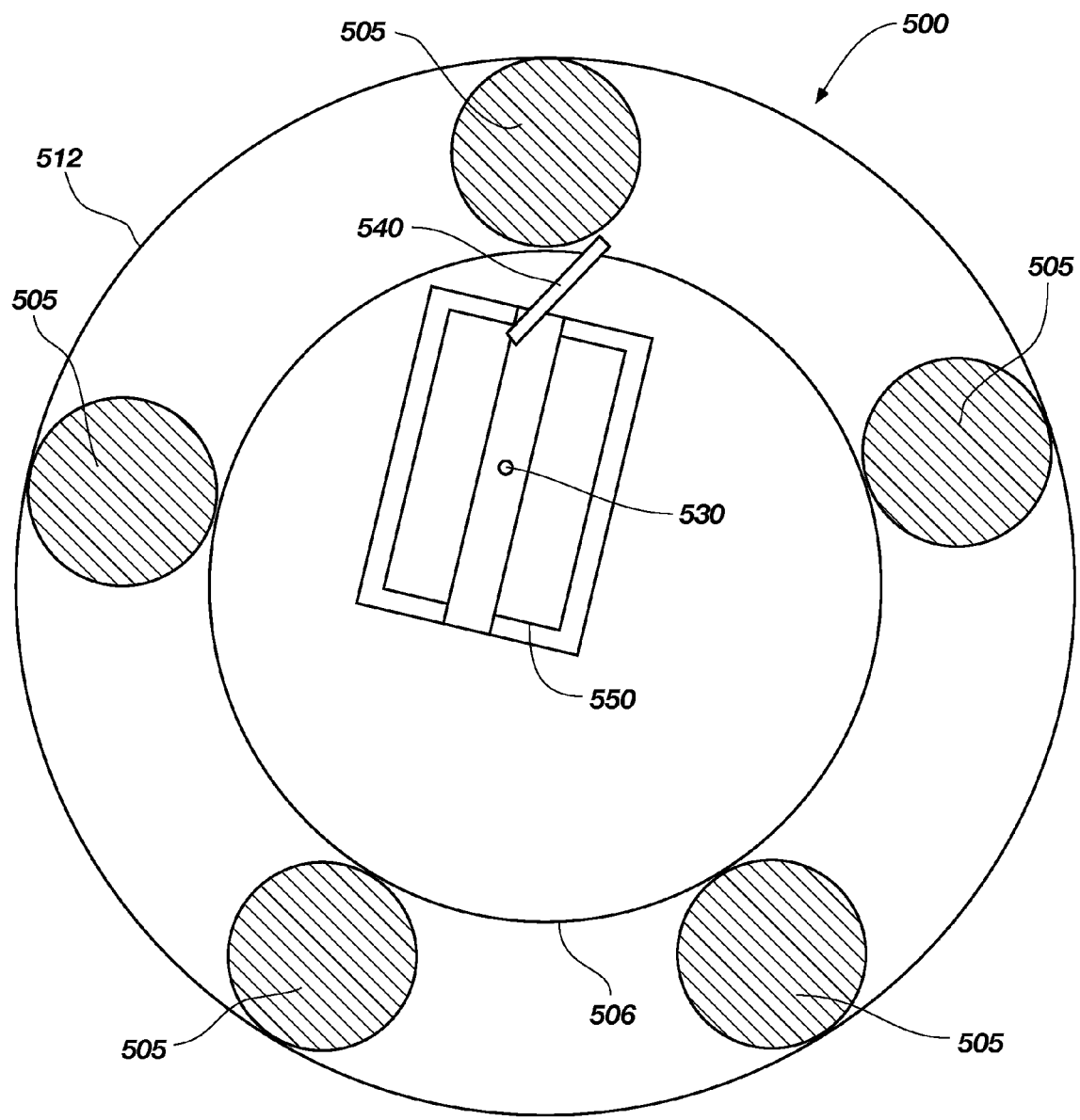
FIG. 5 illustrates an embodiment of a lift in use within a wind tower structure from a top down sectional vantage point.

FIG. 5 illustrates a lift 550 in use within a wind tower structure 500 from a top down sectional vantage point. A wind tower structure 500 may have a plurality of legs 505 and may be configured to support a wind turbine in a position to interface with wind. The wind tower structure 500 may be constructed using a single leg having space therein large enough for a service lift to fit therein. The wind tower structure 500 may be covered in a cladding 512 that may offer protection from the elements and may contribute to structural properties of the wind tower structure 500. An elongate member 530 may be provided as a lifting structure within the wind tower structure 500 and may be attached to the wind tower structure 500 near the top portion providing a generally vertical potential in movement. The elongate member 530 may be a cable, rail or chain so long as it provides the structure necessary to support the lift during movement and maintenance work. A lift 550 may be of standard off the shelf type or one dedicated for a specific use. The lift 550 may include a lateral connection structure 540 for attaching to other tower structures and used control yaw and radial placement of the lift. The other tower structure may be a laterally placed ring 506 which may be rigid or a cable that approximates a ring by attaching at intervals along its circumference to the tower structure 500. The lateral connection structure 540 may have a component such as a cable or chain that is able to worked upon by a guide system or a second component within a guide system to move the lift laterally by controlling the guide system. In the illustration it can be seen that the lift has been positioned radially within the tower structure as the lateral connection structure 540 interacts with the laterally place ring 506.

Figure 6:
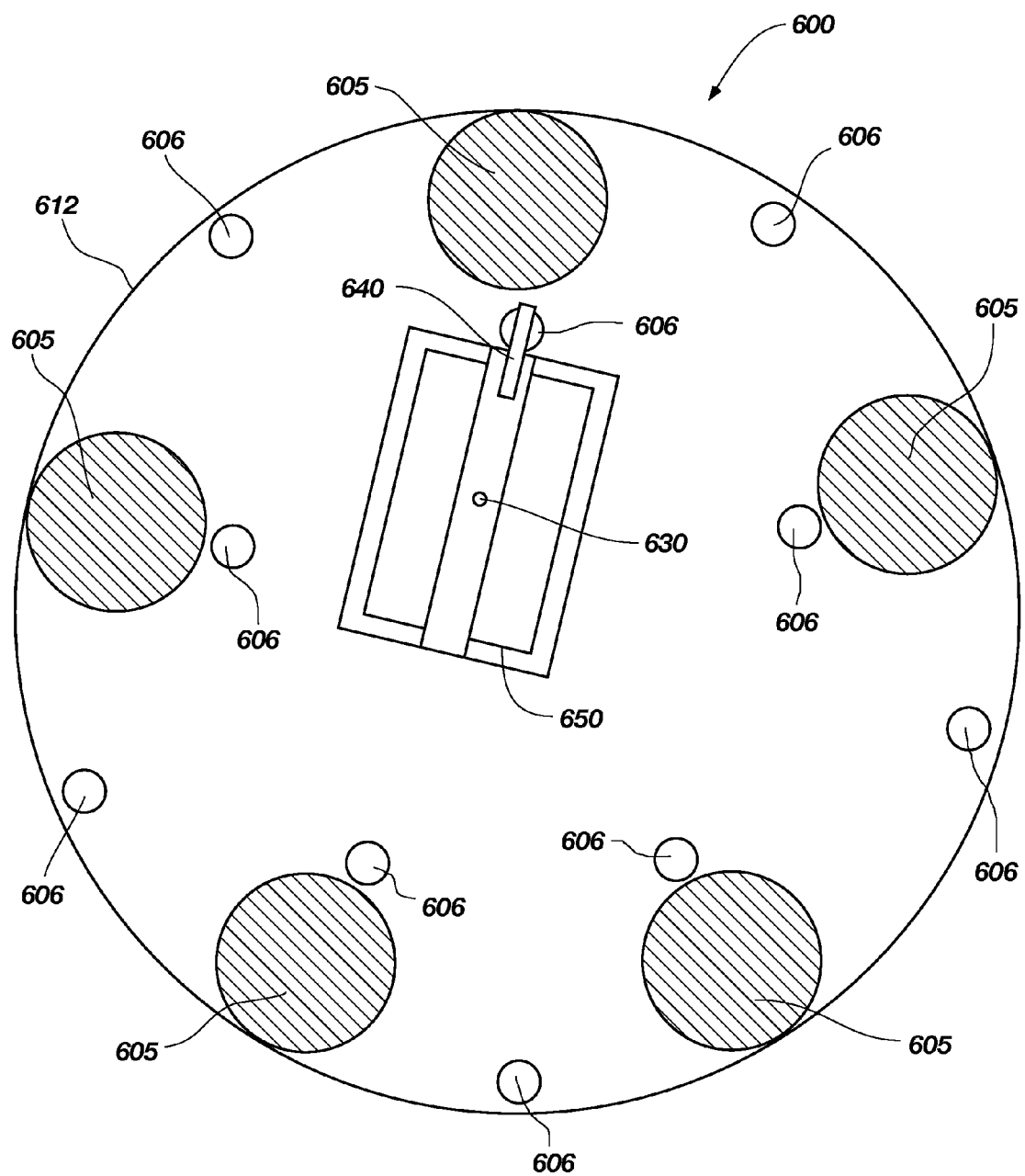
FIG. 6 illustrates an embodiment of a lift in use within a wind tower structure from a top down sectional vantage point.

FIG. 6 illustrates a lift in use within a wind tower structure 600 from a top down sectional vantage point. A wind tower structure 600 may have a plurality of legs 605 and may be configured to support a wind turbine in a position to interface with wind. The wind tower structure 600 may be constructed using a single leg having space therein large enough for a service lift to fit therein. The wind tower structure 600 may be covered in a cladding 612 that may offer protection from the elements and may contribute to structural properties of the wind tower structure 600. An elongate member 630 may be provided as a lifting structure within the wind tower structure 600 and may be attached to the wind tower structure 600 near the top portion providing a generally vertical potential in movement. The elongate member 630 may be a cable, rail or chain so long as it provides the structure necessary to support the lift during movement and maintenance work. A lift 650 may be of standard off the shelf type or one dedicated for a specific use. The lift 650 may include a lateral connection structure 640 for attaching to other tower structures and used to control yaw and radial placement of the lift. The other tower structure may be a laterally placed cable, rail or chain 606 which may be rigid or tension bearing. A plurality of laterally placed structures 606 are illustrated with various placement within the tower structure 600 allowing a user of this embodiment to draw the lift 650 closure to various points within the tower structure 600 for maintenance. The lateral connection structure 640 may have a component such as a cable or chain that is able to worked upon by a guide system or a second component within a guide system to move the lift laterally by controlling the guide system. In the illustration it can be seen that the lift has been positioned radially within the tower structure as the lateral connection structure 640 interacts with a laterally placed structure 606.

Figure 7:
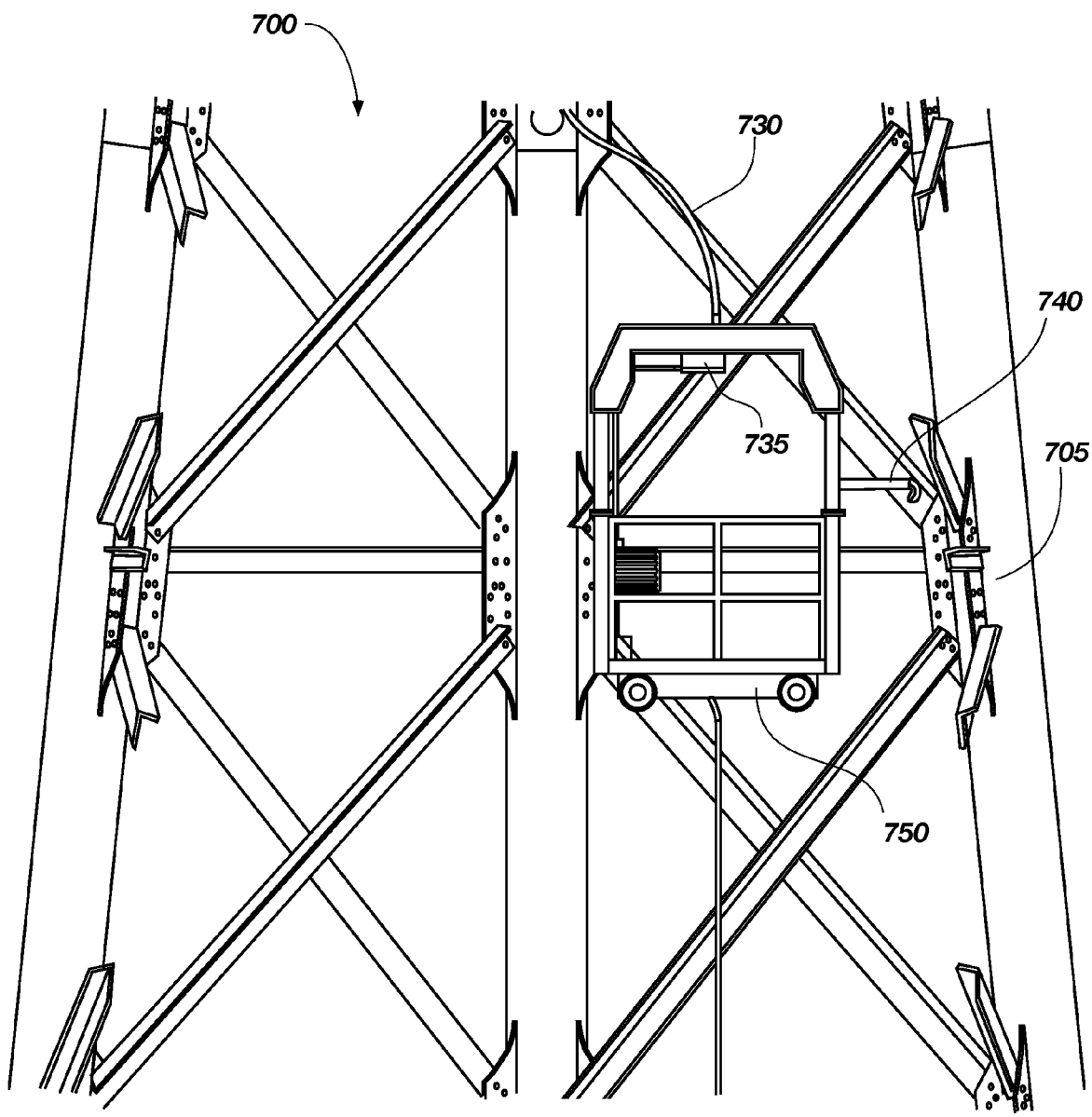
FIG. 7 illustrates an embodiment of a lift in use within a wind tower structure.

FIG. 7 illustrates a lift in use within a wind tower structure. A wind tower structure 700 may have a plurality of legs 705 and may be configured to support a wind turbine in a position to interface with wind. An elongate member 730 may be provided as a lifting structure within the wind tower structure 700 and may be attached to the wind tower structure 700 near the top portion providing a generally vertical potential in movement. The elongate member 730 may be a cable, rail or chain so long as it provides the structure necessary to support the lift during movement and maintenance work. A lift 750 may be of standard off the shelf type or one dedicated for a specific use. A lift 750 may comprise a guide system for mechanically communicating with the elongate member 730 of a wind tower structure 700 wherein said guide system 735 is configured to move along the elongate member 730. The lift 750 may include a lateral positioning structure 740 for attaching to other tower structures and used control yaw and radial placement of the lift. Any tower structure that is capable of bearing the load of positioning the lift 750 is relevant to the disclosure and considered within its scope. The lateral connection structure 740 may be a hook that may be extendable and used by a tower keeper to hook onto a tower structure in close proximity to an area of the tower that needs maintenance and pull the lift 750 to within workable range.

Figure 8:
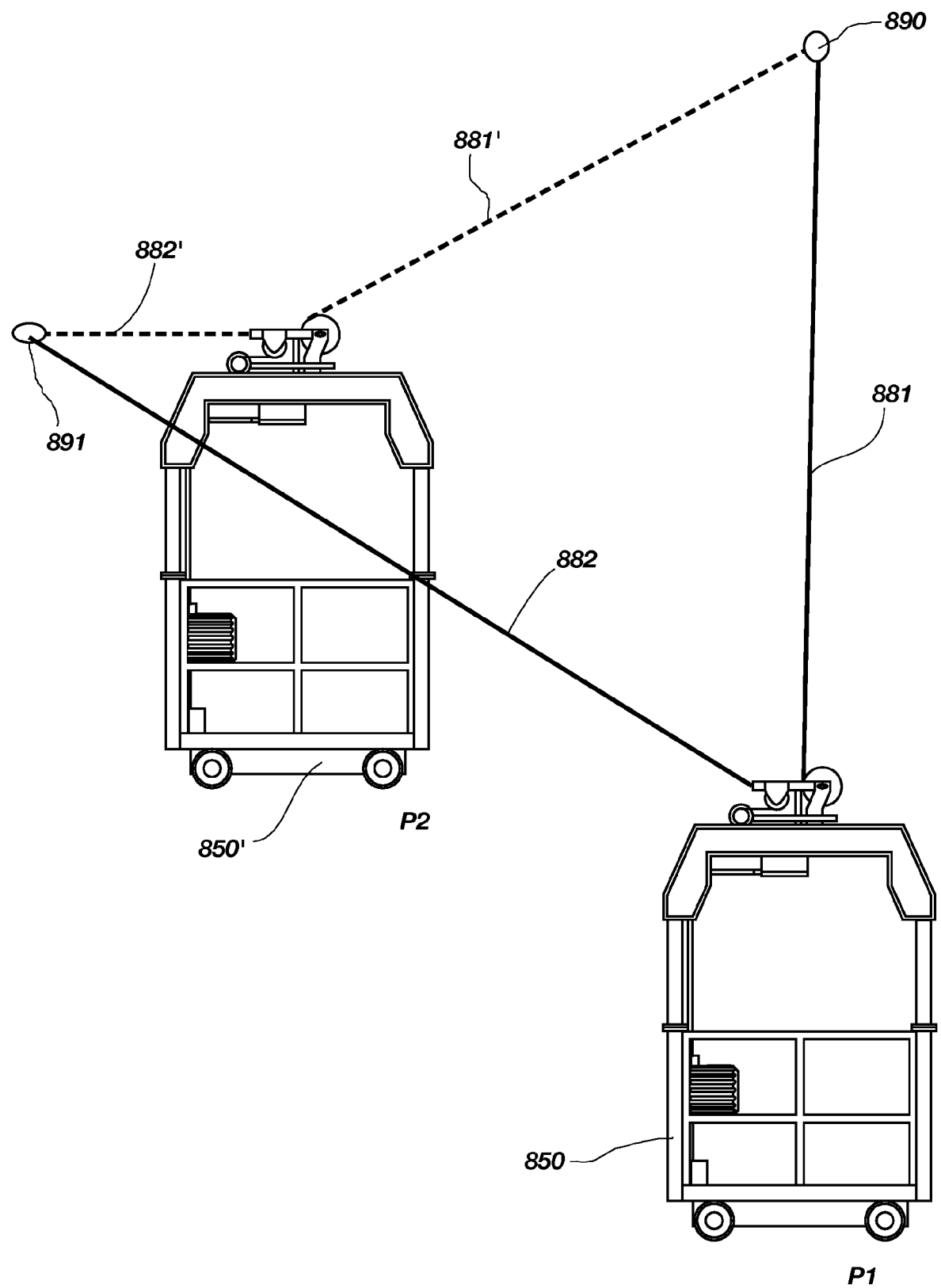
FIG. 8 illustrates an embodiment of the motion of the lift use within a wind tower structure.

FIG. 8 illustrates an embodiment of the motion of the lift. At position 1 designated as P1 on the figure a lift 850 is suspended by a first elongate member 881 acting generally in tension and having a length between the lift 850 and a vertical connection point 890 on a tower structure. At position P1 on the figure the lift 850 is laterally influenced by a second elongate member 882 acting generally in tension and having a length between the lift 850 and a lateral connection point 891 on the tower structure. The lift 850' may be moved to a second position designated by P2 in a vectored path that is relative to the change of lengths of the elongate members 881, 882, 881', 882'. At P2 the lift 850' is laterally influenced by a reduction in the length of 882 to 882'. At P2 the lift 850' is vertically suspended by a reduction of length 881 to 881'. It should be noted that the elongate members 881, 882 may experience vectored loading containing both vertical and lateral components. Additionally, a third vectored component may be used to move the lift 850 in three dimensions. The lift may be moved relative to the elongate members simultaneously thereby moving vertically and laterally simultaneously.

Figure 9:
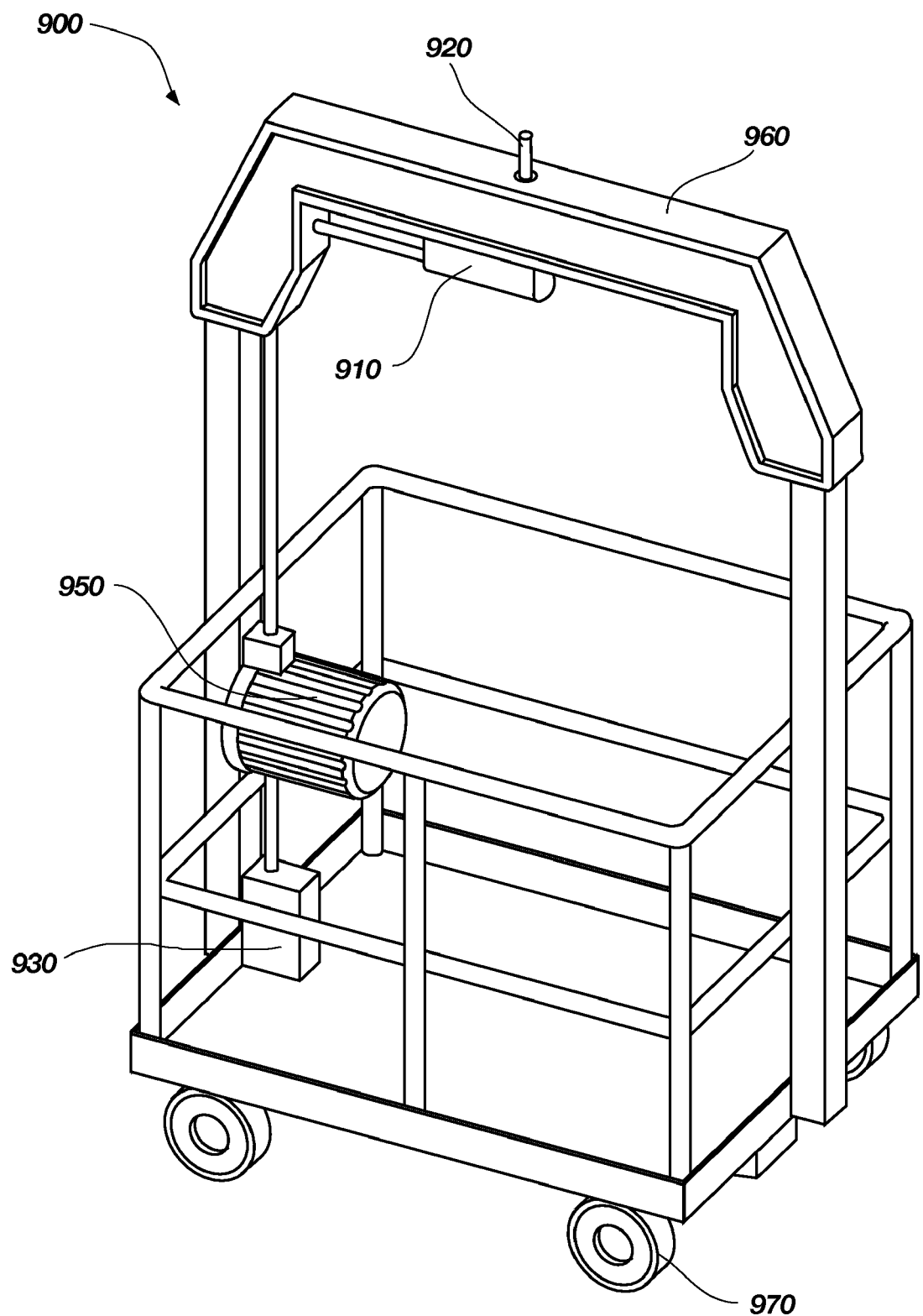
FIG. 9 illustrates an embodiment of an apparatus in the form of a lift used for maintaining a wind tower structure, wherein the wind tower structure may have a plurality of legs defining a space there between that such an apparatus may be disposed.

FIG. 9 illustrates an embodiment of an apparatus in the form of a lift 900 used for maintaining a wind tower structure, wherein the wind tower structure may have a plurality of legs defining a space there between that such an apparatus may be disposed. The lift 900 may be configured for carrying objects such as workers and/or cargo and have a guide system 910 for mechanically communicating with a generally vertical cable, rail or a first elongate member 920 attached to the wind tower structure. The guide system 910 may transmit forces that work to move the lift 900 relative to the cable 920 and thereby relative to the wind tower structure.

A control interface 930 may be included for controlling the amount and direction of the power into the guide system thereby causing said guide system to move the lift relative to the cable 920 such that said lift moves relative to said wind tower structure. The control interface 930 may be a foot pedal or set of pedals that interface with the user thereby providing hands free operation. The control interface 930 may be any set of controls that provides sufficiently to allow a user to move the at least vertically. The control interface 930 may control the power input into a drive system 950. The drive system 950 may spool the cable on to a spool thereby eliminating a tailing portion of the elongate member under the lift. The control interface 930 may change the phase of the power and the amplitude of the power such that the direction and the speed of travel of the lift can be adjusted accordingly.

The drive system 950 may interact with the guide system 910 directly wherein the drive system 950 is integrated into and physically a part of the guide system 910. The drive system 950 may interact with the guide system indirectly through gearing or other transfer device. The guide system 910 may be located on a overhead support 960 thereby keeping the guide system 910 out of the way of the user, and providing a mechanical advantage of using the remaining lift structure as a stabilizer by keeping the center of mass below the guide system 910.

The lift 900 may include wheels 970 to aid in maneuvering the lift on a transport or on the ground. The lift may be detachable and attachable to the cable 920 so that it may be used in more than one tower.

Figure 10:
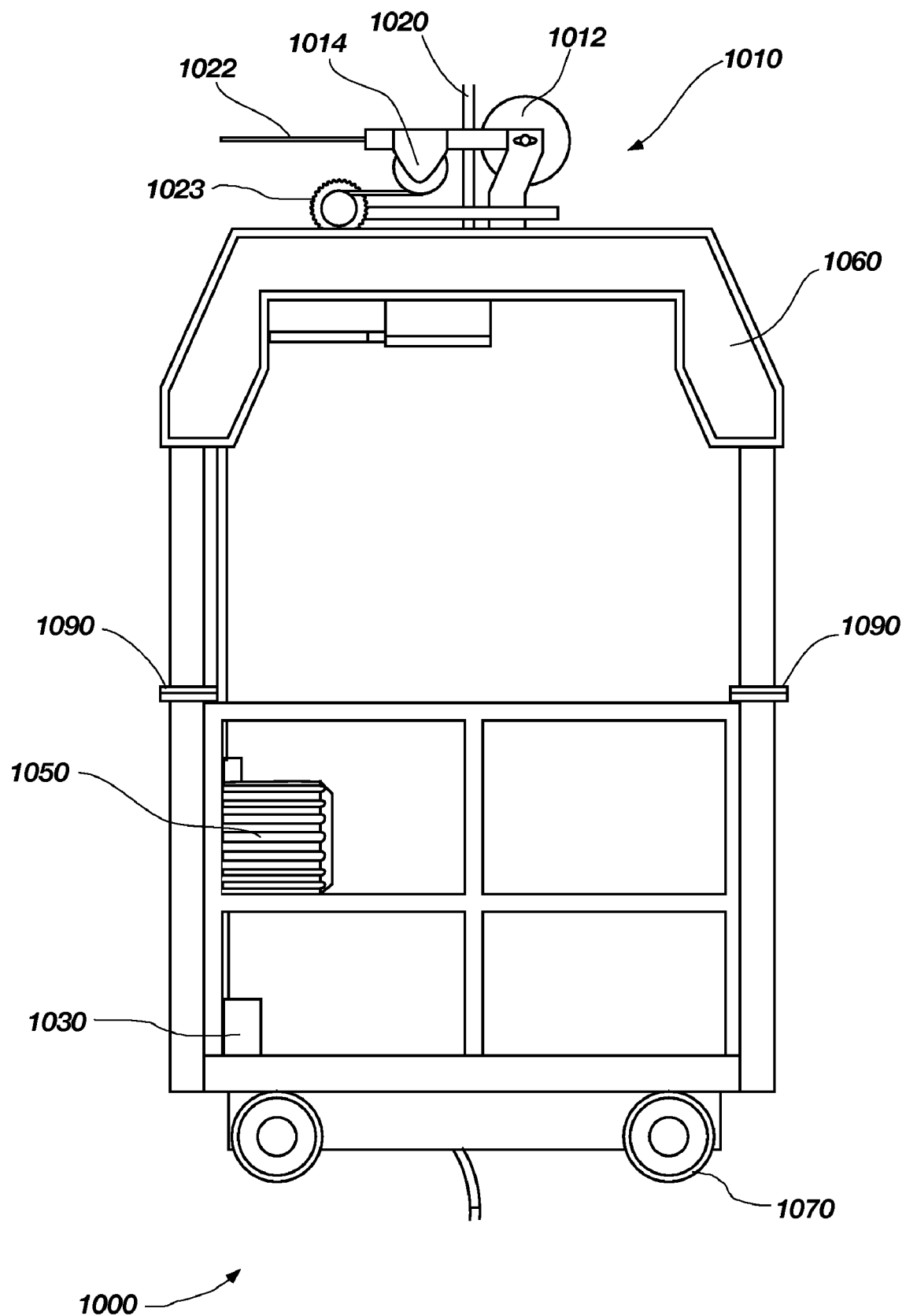
FIG. 10 illustrates an embodiment of an apparatus in the form of a lift used for maintaining a wind tower structure, wherein the wind tower structure may have a plurality of legs defining a space there between that such an apparatus may be disposed.

FIG. 10 illustrates an embodiment of an apparatus in the form of a lift 1000 used for maintaining a wind tower structure, wherein the wind tower structure may have a plurality of legs defining a space there between that such an apparatus may be disposed. The lift 1000 may be configured for carrying objects such as workers and/or cargo and have a guide system 1010 for mechanically communicating with a generally vertical cable, rail or a first elongate member 1020 attached to the wind tower structure. The drive system 1050 and guide system 1010 may transmit forces that work to move the lift 1000 relative to the cable 1020 and thereby relative to the wind tower structure.

A control interface 1030 may be included for controlling the amount and direction of the power into the drive system 1050 thereby causing the lift 1000 to move relative to the cable 1020 such that said lift 1000 moves relative to said wind tower structure. The control interface 1030 may be a foot pedal or set of pedals that interface with the user thereby providing hands free operation. The control interface 1030 may be any set of controls that provides sufficiently to allow a user to move the at least vertically. The control interface 1030 may control the power input into a drive system 1050. The control interface 1030 may change the phase of the power and the amplitude of the power such that the direction and the speed of travel of the lift can be adjusted accordingly.

The drive system 1050 may interact with the guide system 1010 directly wherein the drive system 1050 is integrated into and physically a part of the guide system 1010. The drive system 1050 may interact with the guide system 1010 indirectly through gearing or other transfer device.

The guide system 1010 may include a vertical drive portion 1012 that interfaces with an elongate member 1020 for moving the lift 1000 in a generally vertical direction and acts to translate lateral forces into vertical forces allowing the lift 1000 to be stabilized or righted by its weight. The guide system 1010 may include a lateral drive portion 1014 that may interface with a lateral placement member 1022 for generally positioning the lift 1000 radially within the wind tower. The lateral placement portion 1014 may comprise a lateral drive system 1023 configured to mechanically communicate with the lateral placement member 1022. The lateral drive system 1023 may be configured to spool the lateral placement member 1022 on a spool or may pass it through.

The guide system 1010 may be located on an overhead support 1060 thereby keeping the guide system 1010 out of the way of the user, and providing a mechanical advantage of using the remaining lift structure as a stabilizer by having the center of mass below the guide system 1010.

The lift 1000 may include wheels 1070 to aid in maneuvering the lift on a transport or on the ground. The lift may be detachable and attachable to the cable 1020 so that it may be used in more than one tower. The lift may include a hinge or pin 1090 in a structural member that thereby allows the over all height of the lift to be shortened. A shortened lift 1000 may better fit onto a transport and allow for the use a smaller opening in the tower structure.

Figure 11:
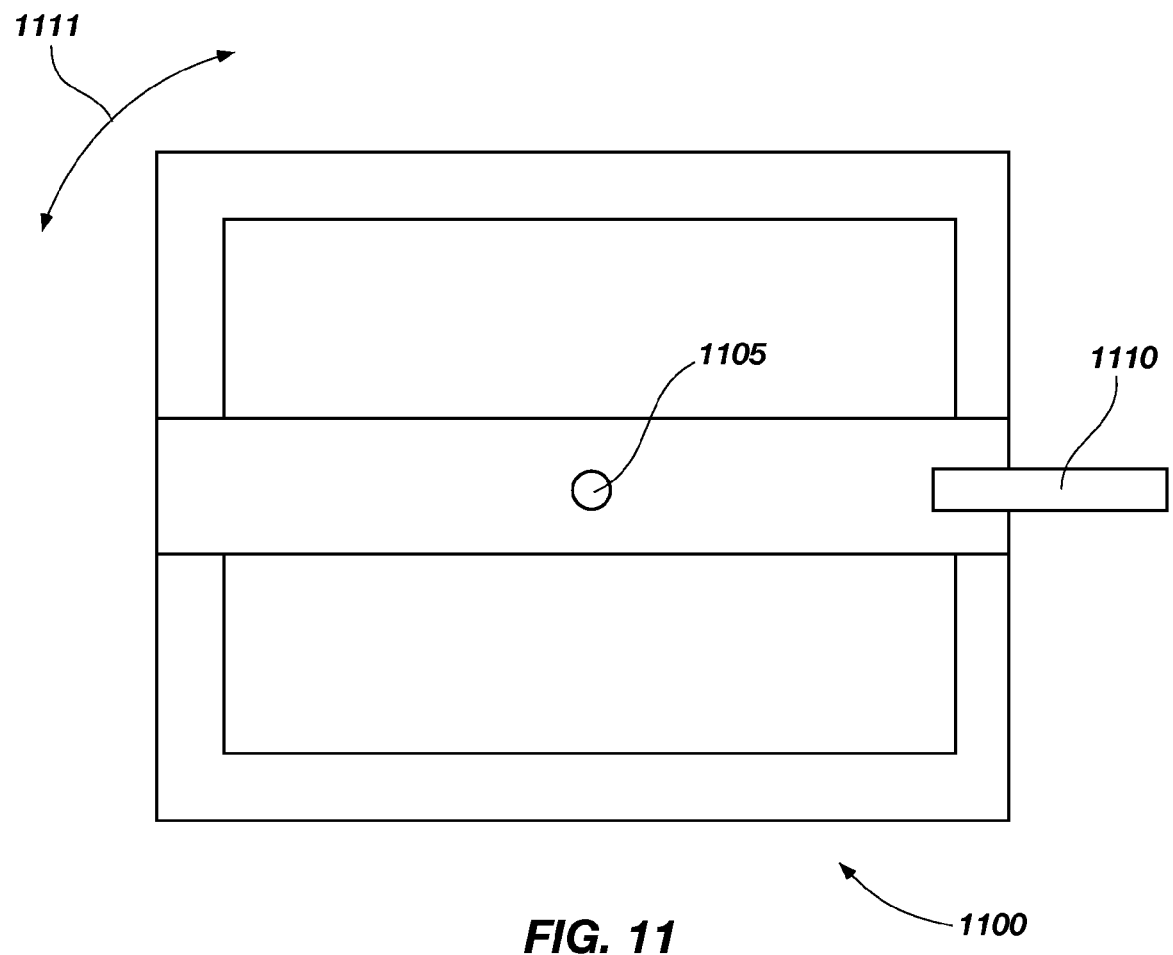
FIG. 11 illustrates a top down view of an embodiment of an apparatus in the form of a lift used for maintaining a wind tower structure, wherein the wind tower structure may have a plurality of legs defining a space there between that such an apparatus may be disposed.

FIG. 11 illustrates a top down view of an embodiment of an apparatus in the form of a lift 1100 used for maintaining a wind tower structure, wherein the wind tower structure may have a plurality of legs defining a space there between that such an apparatus may be disposed. The lift 1100 may be configured for carrying objects such as workers and/or cargo and have a guide system for mechanically communicating with a generally vertical cable, rail or a first elongate member attached to the wind tower structure. A control interface may be included for controlling the amount and direction of the power into the drive system and guide system thereby causing said drive system and guide system to move the lift relative to the cable such that said lift moves relative to said wind tower structure.

The lift 1100 may include wheels to aid in maneuvering the lift on a transport or on the ground. The lift may be detachable and attachable to a cable so that it may be used in more than one tower. The lift may tend to rotate around a point of rotation 1105 created where a cable mechanically interacts with the lift structure. The embodiment may have a lateral placement structure 1110 configured to mechanically interact with a member extending from the wind tower structure for controlling the yaw or rotation (shown by arrows 1111) of the lift 1100. This lateral placement structure 1110 may be incorporated into a guide system. The member of the wind tower used for controlling the yaw of the lift 1100 may be a second elongate member such as a second cable. The guide system or lateral placement structure may mechanically communicate with the first and second elongate members contemporaneously to move the lift in a vectored path.

Figure 12:
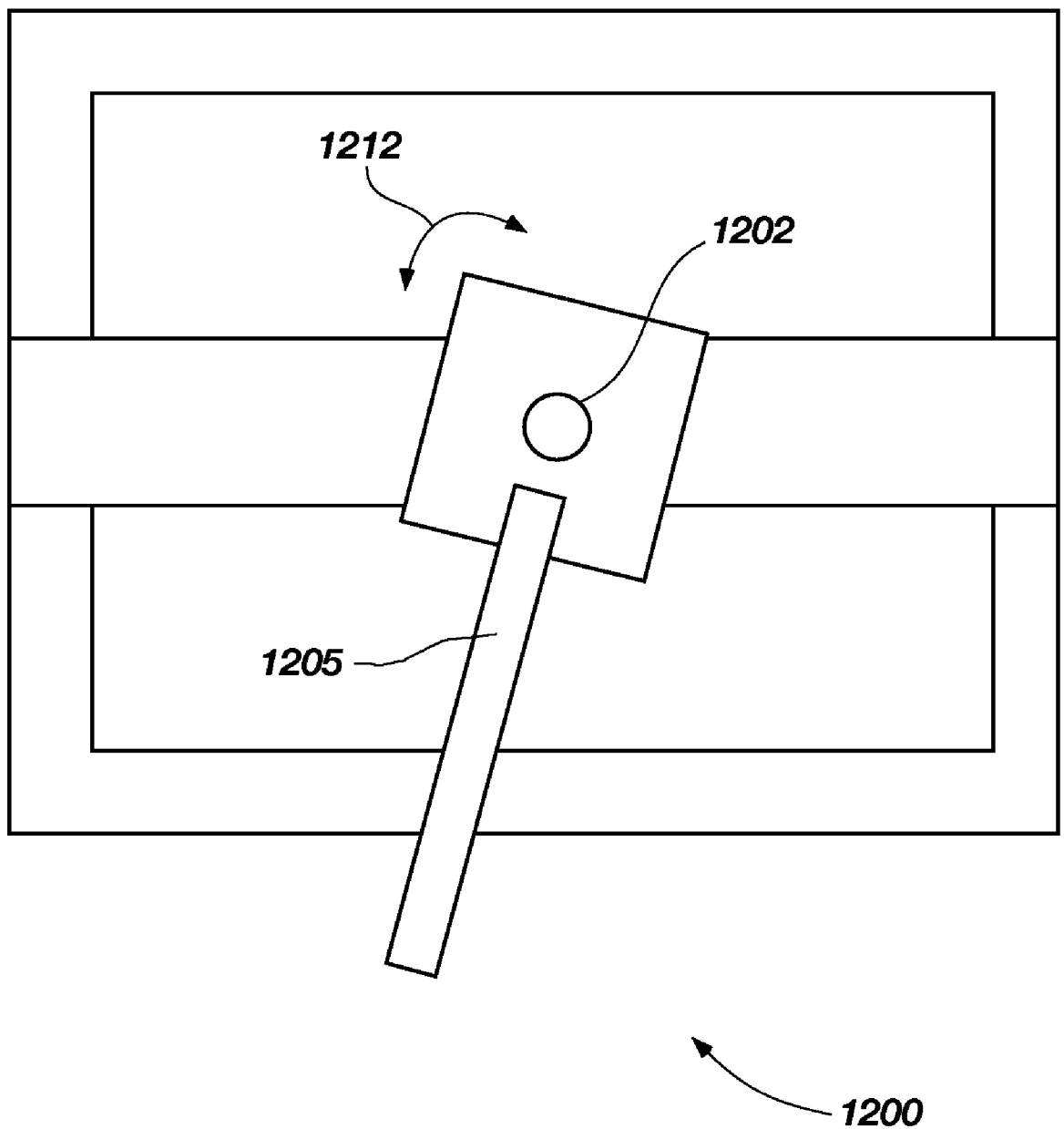
FIG. 12 illustrates a top down view of an embodiment of an apparatus in the form of a lift used for maintaining a wind tower structure, wherein the wind tower structure may have a plurality of legs defining a space there between that such an apparatus may be disposed.

FIG. 12 illustrates a top down view of an embodiment of an apparatus in the form of a lift 1200 used for maintaining a wind tower structure, wherein the wind tower structure may have a plurality of legs defining a space there between that such an apparatus may be disposed. The lift 1200 may be configured for carrying objects such as workers and/or cargo and have a drive system and a guide system 1205 for mechanically communicating with a generally vertical cable, rail or a first elongate member attached to the wind tower structure. A control interface may be included for controlling the amount and direction of the power into the drive system and guide system 1205 thereby causing said drive system and guide system 1205 to move the lift relative to the cable such that said lift moves relative to said wind tower structure.

The lift 1200 may be detachable and attachable to the cable so that it may be used in more than one tower. The lift 1200 may tend to rotate around a point of rotation created where a cable mechanically interacts with the lift structure or guide system 1205. The embodiment may have a lateral placement structure configured to mechanically interact with a member extending from the wind tower structure for controlling the yaw or rotation of the lift 1200. This lateral placement structure may be incorporated into the guide system 1205. The member of the wind tower used for controlling the yaw of the lift 1200 may be a second elongate member such as a second cable. The guide system 1205 or lateral placement structure may mechanically communicate with the first and second elongate members contemporaneously to move the lift in a vectored path. The guide system 1205 may include a pivot connection 1202 with the remaining lift structures allowing a user to control the yaw of the lift 1200. The pivot connection 1202 allows for a rotation angle as shown by the arrows 1212. The pivot connection 1202 may be rotated by a planetary gear or other gearing. The guide system 1205 or lateral placement structure may mechanically communicate with the first and second elongate members contemporaneously to move the lift in a vectored path. By rotating the guide system 1205 about the pivot connection 1202, the orientation of the lift 1200 relative to the tower may be controlled.

Figure 13:
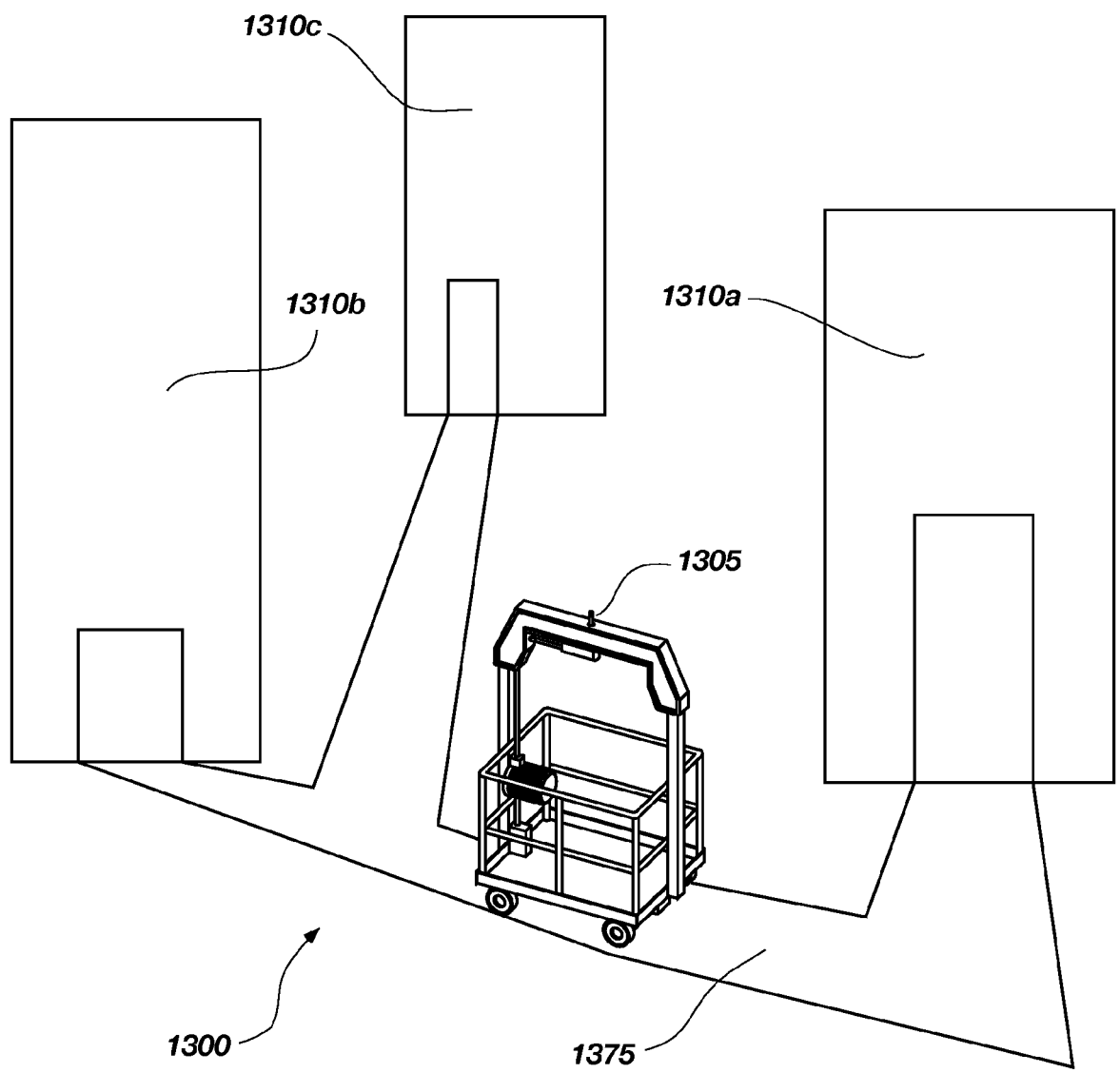
FIG. 13 illustrates an embodiment of a use of a self powered or manually powered lift as part of a system used for maintaining a wind tower structure comprising a plurality of wind tower structures.

FIG. 13 illustrates a use of a self powered or manually powered lift 1305 as part of a system 1300 comprising a plurality of wind tower structures 1310a, 1310b, 1310c. A lift 1305 may be configured for carrying cargo and/or a person performing maintenance and related activities. The lift 1305 may be configured to be with a self propelling mechanism or may be pushed manually. The lift 1305 may be configured to move from one wind tower structure to another on a path 1375 or may be configured for traversing the type of terrain surrounding the wind towers 1310a, 1310b, 1310c. The transport 1305 may be configured to change in dimension to pass through various sized openings within a plurality of wind towers.

Figure 14:
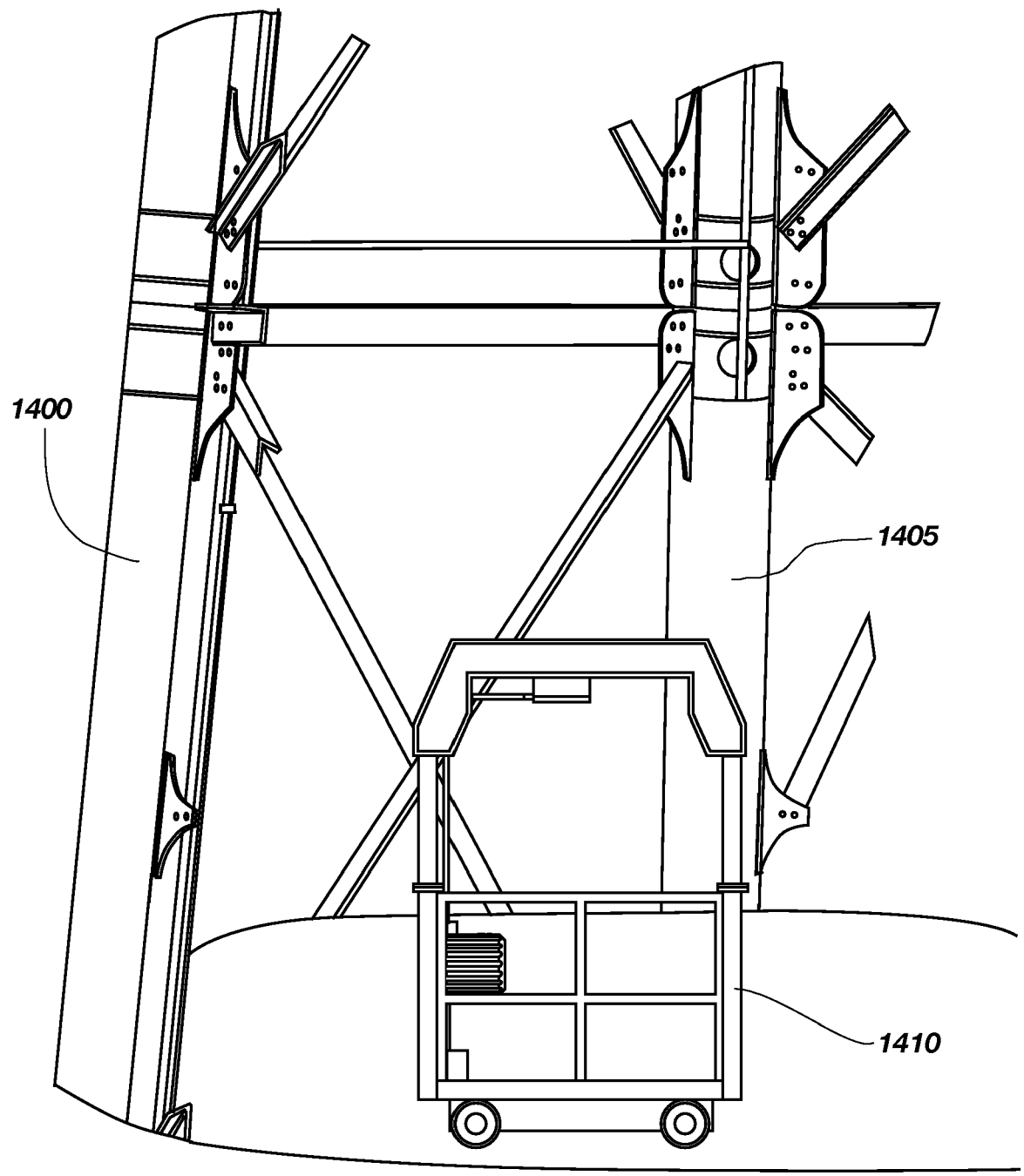
FIG. 14 illustrates an embodiment of a use of a wind tower for storing a lift therein.

FIG. 14 illustrates a use of a wind tower 1400 for storing a lift 1400 therein. A wind tower structure 1400 may have a plurality of legs 1405 and may be configured to support a wind turbine in a position to interface with wind. The wind tower structure 1400 may be constructed using a single leg having space therein large enough for a service lift to fit therein. The wind tower structure 1400 may covered in a cladding that may offer protection from the elements and may contribute to structural properties of the wind tower structure 1400.

An opening may be provided with in the cladding of the wind tower structure. A door may be provided for the opening allowing a tower keeper to open and close the opening as desired for maintenance of the wind tower structure 1400. The door may be configured to open inward or outward. The door may be of a lifting type that may be seen on a garage automatic or otherwise. The opening may be configured to accept a lift 1410 there through either alone or on a transport. The opening may be configured to accept a lift 1410 in a compacted state there through either alone or on a transport. While a lift is not being used it may be stored within a space created between the legs 1405 of the wind tower 1400. The door may be used to access other items that may have been stored within the wind tower structure 1400. The wind tower 1400 may store a transport for the lift 1410 therein.

In view of the foregoing, those having ordinary skill in the relevant art will appreciate the advantages provided by the features of the present disclosure.

In the foregoing Detailed Description, various features of the present disclosure are grouped together in single embodiments for the purpose of streamlining the disclosure. This method of disclosure is not to be interpreted as reflecting an intention that the claimed disclosure requires more features than are expressly recited in each claim hereinafter presented. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus used for maintaining a wind tower, the wind tower having a plurality of leg members defining a space there between and configured to support a wind turbine on an elevated portion thereof, the apparatus comprising:
    a lift configured for carrying objects wherein the lift comprises a support surface for supporting objects;
    a drive system for mechanically communicating with a first elongate member attached to the wind tower wherein said drive system is configured to move the lift relative to said first elongate member;
    a control interface for controlling a power input into said drive system thereby causing said drive system to move the lift relative to said first elongate member such that said lift moves relative to said wind tower; and
    a guide system in communication with said first elongate member and adapted to allow said lift to maintain a predetermined orientation, wherein said guide system is detachable from and attachable to said first elongate member.

2. The apparatus of claim 1 wherein said guide system comprises a second drive system.

3. The apparatus of claim 1 wherein said guide system is rotatable relative to the lift about the yaw axis thereby allowing the service lift to be controllable about the yaw axis.

4. The apparatus of claim 1 further comprising a height adjustment configured to allow said lift to be changed dimensionally for portability.

5. The apparatus of claim 1 further comprising an attachment configured to removably attach to a member extending from the wind tower for controlling the yaw of the lift relative to the tower.

6. The apparatus of claim 1 further comprising an attachment configured to removably attach to a second elongate member extending from the wind tower for controlling the radial positioning of the lift relative to the wind tower.

7. The apparatus of claim 6 wherein said attachment is incorporated into a guide system such that the guide system mechanically communicates with the first and second elongate members contemporaneously to move the lift in a vectored path.

8. The apparatus of claim 6 wherein said attachment and the drive system communicate contemporaneously with the first and second elongate members to move the lift in a vectored path.

9. A system for maintaining a tower for a wind turbine comprising:
    a lift configured for carrying objects;
    a drive system for providing a positioning force for the apparatus;
    a control interface for controlling the drive system;
    an elongate member for providing a lifting structure between said tower and said lift;
    an opening in the tower configured to allow placement of the lift within the interior of the wind tower;
    a connection for connecting the elongate member to the lift; and
    a guide system in communication with said elongate member and adapted to allow said lift to maintain a predetermined orientation, wherein said guide system is detachable from and attachable to said elongate member.

10. The system of claim 9 further comprising a second elongate member for controlling the yaw of the lift relative to the wind tower.

11. The system of claim 10 wherein said second elongate member has a lateral component allowing a user to draw closer to a portion of the tower.

12. The system of claim 9 further comprising a second elongate member for controlling the radial placement of the lift relative to the tower.

13. The system of claim 9 further comprising a transport for transporting the lift.

14. The system of claim 13 wherein the transport is configured such that a portion of the transport can enter into the opening in the wind tower.

15. The system of claim 13 wherein the transport is configured such the entire transport may fit within the wind tower.

16. The system of claim 9 wherein the lift is mobile and able to be moved through the opening in the wind tower.

17. The system of claim 9 wherein said drive system resides on said lift.

18. The system of claim 9 wherein said drive system resides on said wind tower.

19. A method for maintaining wind towers supporting wind turbines, the method comprising:

positioning a lift within a wind tower through an opening in the wind tower configured to allow placement of the lift within the tower;

connecting said lift to a tower by an elongate member disposed between the tower and the lift;

attaching a guide system to the elongate member, the guide system in communication with said elongate member and adapted to allow said lift to maintain a predetermined orientation, wherein said guide system is detachable from and attachable to said elongate member; and positioning the lift into a position on said elongate member to perform maintenance by actuating a control for controlling a drive system that provides a force.

20. The method of claim 19 further comprising exerting a force in a lateral direction for positioning the lift radially relative to a tower.

21. The method of claim 20 further comprising exerting a force laterally thereby positioning the lift closer to a wind tower portion in need of maintenance.

22. The method of claim 19 further comprising transporting the lift through an opening in a wind tower.

23. The method of claim 22 further comprising transporting the lift to a plurality of wind towers.

24. The method of claim 22 further comprising storing the lift within a wind tower.

25. The method of claim 22 further comprising actuating a door within a wind tower.

26. The method of claim 19 further positioning only a portion of a transport in to an opening in a wind tower.

27. The method of claim 19 further positioning the entire transport into a wind tower.

28. A system for maintaining a plurality of towers for a wind turbine comprising:

a lift configured for carrying objects;

a motor for providing a lifting force for the apparatus;

a control interface for controlling the motor;

an elongate member for providing a lifting structure between a tower and said lift;

an opening configured to allow placement of the lift within a tower; and a connection for connecting an elongate member to the lift; and a guide system in communication with said elongate member and adapted to allow said lift to maintain a predetermined orientation, wherein said guide system is detachable from and attachable to said elongate member.

29. The system of claim 28 further comprising a second elongate member for controlling the yaw of the lift relative to a tower.

30. The system of claim 29 wherein said second elongate member has a lateral component allowing a user to position the lift closer to a portion of a tower.

31. The system of claim 28 further comprising a second elongate member for controlling the radial placement of the lift relative to a wind tower.

32. The system of claim 31 wherein the transport is configured such that a portion of the transport can enter into an opening in a wind tower.

33. The system of claim 31 wherein the transport is configured such the entire transport may fit within a wind tower.

34. The system of claim 28 further comprising a transport for transporting the lift through an opening in a wind tower.

35. The system of claim 28 wherein the lift is mobile and able to be moved through an opening in a wind tower.

36. The system of claim 28 wherein said drive system resides on said lift.

37. The system of claim 28 wherein a plurality of drive systems reside on said wind towers.

* * * * *